W. S. McKENZIE.
Farm Fences.
No. 141,284. Patented July 29, 1873.
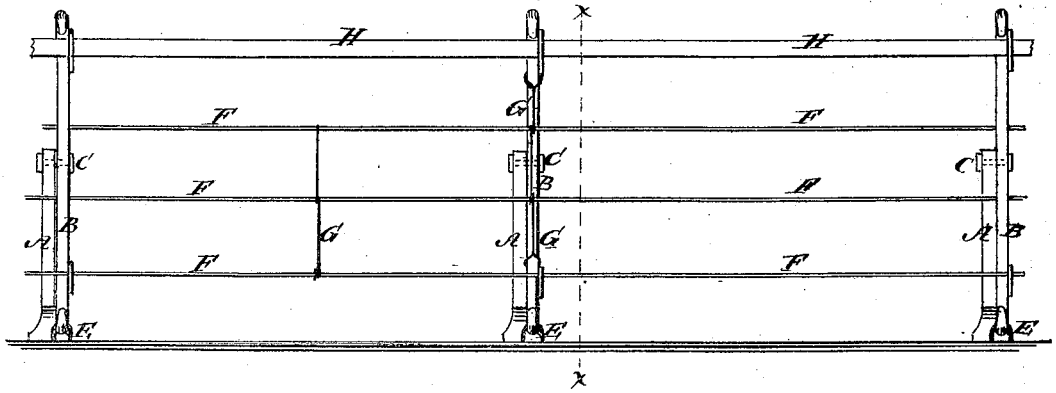
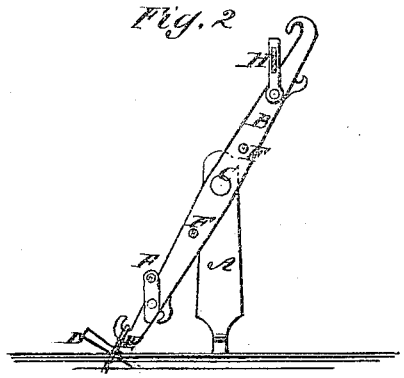
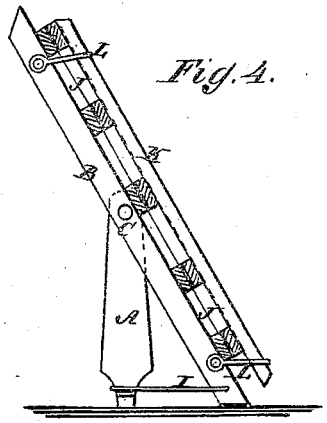
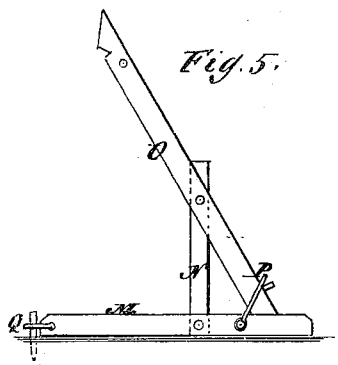
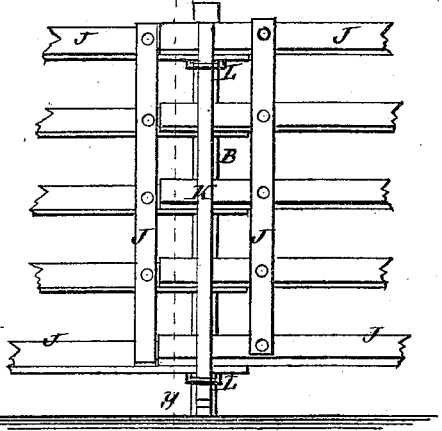
Witnesses:
Inventor:
W. S. McKenzie
Per
Attorneys.

UNITED STATES PATENT OFFICE.

WINFIELD S. McKENZIE, OF ROCKWALL, TEXAS.

IMPROVEMENT IN FARM-FENCES.

Specification forming part of Letters Patent No. 141,284, dated July 29, 1873; application filed April 12, 1873.

*To all whom it may concern:*

Be it known that I, WINFIELD S. MCKENZIE, of Rockwall, in the county of Kaufman and State of Texas, have invented a new and useful Improvement in Fence, of which the following is a specification:

Figure 1 represents a portion of my improved fence. Fig. 2 is a vertical cross-section of the same taken through the line $x\ x$, Fig. 1. Fig. 3 represents a portion of my improved fence in which boards are used instead of wires. Fig. 4 is a vertical cross-section of the same taken through the line $y\ y$, Fig. 3. Fig. 5 is a detail view of the portable brace. Figs. 6 and 7 represent a roller and double bar, which are applied in practice for tightening the wires of the fence.

Similar letters of reference indicate corresponding parts.

My invention has for its object to furnish an improved fence, simple in construction, convenient and reliable in use, inexpensive in manufacture, and which is especially designed for use in sections of the country where timber is scarce and dear. The invention consists in the posts and pivoted or tilting bars for supporting a fence formed of wires or other material; in the combination of the loops and bars with the bars or posts that support the fence; in the portable brace for strengthening an inclined fence against pressure, as hereinafter fully described.

A are the posts, which are made about half the height of the fence. The upper parts of the posts A are made wide in a direction at right angles with the length of the fence, and their lower parts that enter the ground are made wide in a direction parallel with the length of the fence, or in both directions, so as to offer the greatest possible resistance to side pressure. B are the supporting-bars of the fence, which are pivoted to the side of the upper end of the posts A by a bolt, C, which passes through the centers of the said bars B. The lower ends of the bars B are secured to the ground by pins or short stakes D driven into the ground with their points inclined toward the lower end of the post A. The pins or stakes D are provided with a hook or notch for receiving and holding a wire loop, E, attached to the lower end of the said bars B.

F are the wires, which are passed through holes, notches, or eyes formed in or attached to the bars B. The wires F may be connected and held in their proper relative positions by cross-wires G secured to them, as shown in Fig. 1. If desired, the lower wire F only may be secured to the bars B, and the other wires held in their proper relative positions by a cross-wire, G, connecting said wires F, and having its ends secured to the upper and lower parts of the said bars B, as shown in Fig. 1. To eyes attached to the upper parts of the bars B are secured strips H of tin or other suitable material, (wires may be used, if desired,) to attract the attention of stock and warn them off before they have come in contact with the fence. When changing stock from one field to another the stakes D may be drawn, the loops E detached, and the fence tilted over to face in the other direction, and again secured in place by the pins and loops D E. If desired, the lower ends of the bars B may be connected with the lower part of the posts A by a rod or loop, I, as shown in Fig. 4. If desired, rails, poles, or boards J may be used instead of the wire F. The boards J may be connected with each other in panels by cross-bars, for convenience in setting up the fence. In this case the panels J overlap each other upon the bars B, where they are secured in place by bars K placed upon the other side of the panels J, and connected with the bars B by wire loops L.

By this construction the weight of the panels forces the bars K downward upon the loops L, clasping the panels firmly between the bars K and B with a greater or less force, according to the weight of said panels. The bars K and loops L may be used for connecting the panels J to vertical posts, if desired.

Fig. 5 represents a portable brace for strengthening the fence against the wind or other pressure.

M is the base-bar, which is designed to be placed upon the ground at right angles with the length of the fence, and to which, a little in front of the center, is pivoted the lower end of the connecting-bar N, to the upper end of which is pivoted the middle part of the bar O. By this construction the bar O can be readily adjusted at the exact inclination of the fence, and with its forward or lower end resting upon the bar M, where it is secured in place by a loop, P, pivoted to said base-bar M, so that it may be turned up over the end of the said bar O, whence it may be prevented from dropping by a pin.

By this construction the center or resultant of a force pressing against the fence will be above the pivoting-point of the bar M, and will thus be firmly resisted.

The rear end of the base-bar M has a loop, Q, pivoted to it to receive a pin for holding the rear part of the brace securely in place. With this construction, by removing the pin, the loop P will drop, and the bar O may be pushed back to lie upon the bar M, so that the brace can be conveniently carried from place to place. The wires may be conveniently and expeditiously stretched by means of the double bar B and roller R applied at the end of a section of the fence.

Having thus described my invention, I claim as new and desire to secure by Letters Patent—

1. The short posts A and pivoted or tilting bars B for supporting a fence, whether said fence be formed of wires or other material, substantially as herein shown and described.

2. The combination of the loops L and bars K with the bars or posts that support the fence, substantially as herein shown and described.

3. The portable brace M N O P Q for strengthening the inclined fence against pressure, substantially as herein shown and described.

WINFIELD SCOTT McKENZIE.

Witnesses:
J. L. NORVELL,
I. D. BOYDSTUN.